United States Patent [19]

Andersland et al.

[11] Patent Number: 5,730,550

[45] Date of Patent: Mar. 24, 1998

[54] METHOD FOR PLACEMENT OF A PERMEABLE REMEDIATION ZONE IN SITU

[75] Inventors: Orlando B. Andersland, East Lansing; Craig S. Criddle, Lansing; Roger B. Wallace, Okemos; David C. Wiggert, East Lansing, all of Mich.

[73] Assignee: Board of Trustees operating Michigan State University, East Lansing, Mich.

[21] Appl. No.: 600,447

[22] Filed: Feb. 13, 1996

Related U.S. Application Data

[60] Provisional application No. 60/002,335, Aug. 15, 1995.

[51] Int. Cl.$^6$ .................... E02D 19/14; E21D 1/12
[52] U.S. Cl. .................... 405/128; 405/130; 588/1; 588/2; 588/16
[58] Field of Search .................... 405/128, 130; 588/1, 2, 16

[56] References Cited

U.S. PATENT DOCUMENTS

| | | | |
|---|---|---|---|
| 4,039,438 | 8/1977 | Anderson | 210/610 |
| 4,447,541 | 5/1984 | Peterson | 435/264 |
| 4,576,717 | 3/1986 | Collin et al. | 210/610 |
| 4,683,064 | 7/1987 | Hallberg et al. | 210/605 |
| 4,713,343 | 12/1987 | Wilson, Jr. et al. | 435/264 |
| 4,749,491 | 6/1988 | Lawes et al. | 210/610 |
| 4,765,902 | 8/1988 | Ely et al. | 210/610 |
| 4,860,544 | 8/1989 | Krieg et al. | 62/45.1 |
| 4,925,802 | 5/1990 | Nelson et al. | 435/262 |
| 4,974,425 | 12/1990 | Krieg et al. | 62/45.1 |
| 4,998,848 | 3/1991 | Hansen | 405/128 |
| 5,006,250 | 4/1991 | Roberts et al. | 210/610 |
| 5,050,386 | 9/1991 | Krieg et al. | 62/45.1 |
| 5,066,166 | 11/1991 | Hansen | 405/128 |
| 5,265,674 | 11/1993 | Fredrickson et al. | 166/246 |
| 5,268,109 | 12/1993 | Boyd | 210/691 |
| 5,300,227 | 4/1994 | Varadaraj et al. | 210/610 |
| 5,324,137 | 6/1994 | Dash | 405/128 |
| 5,326,703 | 7/1994 | Hazen et al. | 435/262.5 |
| 5,339,893 | 8/1994 | Haynes et al. | 165/45 |
| 5,416,257 | 5/1995 | Peters | 588/1 |
| 5,551,799 | 9/1996 | Dash | 405/130 X |

FOREIGN PATENT DOCUMENTS

| | | |
|---|---|---|
| 958745 | 5/1964 | United Kingdom. |
| 9006480 | 6/1990 | WIPO. |

OTHER PUBLICATIONS

Starr, Robert C., et al., Ground Water 32:465–476 (May–Jun. 1994).

O'Hannesin, et al., Presentation at the Canadian Geotechnical Soc. Conf. Oct. 25–28 (1992).

Witt, Michael E., et al., 3rd Int. Symposium, in situ, and on site bioremediation (presentation of paper).

O. B. Andersland, et al., Journal of Contaminant Hydrology (in 1995 press),"Frozen Soil Sub Surface Barriers: Formation and Ice Erosion".

O. B. Andersland, et al., Journal of Environmental Engineering American Soc. of Civil Eng. 122, No. 3 (1996) "Hydraulic Conductivity of Frozen Granular Soils".

*Primary Examiner*—Tamara L. Graysay
*Assistant Examiner*—Tara L. Mayo
*Attorney, Agent, or Firm*—Ian C. McLeod

[57] ABSTRACT

A method for placement of remediation zones for treatment of contaminated groundwater in situ (10, 10A, 50, 60, 70, 80, 124) is described. The zones can be infiltrated or can be excavated and filled with a treatment composition to provide the remediation. A frozen wall (11) is temporarily established by freeze pipes (16, 18, 16A, 18A, 51, 52, 61, 62, 72, 73, 74, 75, 84, 85) regions (120,122) around the zone for the injection or excavation and filtration and then the frozen wall created is removed by thawing. The contaminated groundwater flows through the zone, preferably using a permanent barrier or wall (86) acting as a funnel. The method provides reliable and economic remediation in situ.

42 Claims, 11 Drawing Sheets

METHOD FOR PLACEMENT OF A PERMEABLE REMEDIATION ZONE IN SITU

CROSS-REFERENCE TO RELATED APPLICATION

This application is based upon provisional application Ser. No. 60/002,335, filed Aug. 15, 1995.

BACKGROUND OF THE INVENTION

(1) Field of the Invention

The present invention relates to a method for the placement of a remediation zone containing a treatment composition in situ using frozen soil walls to isolate the remediation zone. Upon thawing of the frozen walls, the remediation zone removes contaminants from water flowing through the treatment composition. In particular, the present invention relates to a method wherein a volume of the soil is temporarily isolated from the surrounding groundwater using frozen soil walls established with a row of freeze pipes surrounding the remediation zone. The treatment composition is placed into the remediation zone in the path of the contaminated water and then the frozen soil walls are thawed to allow the flow of water through the remediation zone.

(2) Description of Related Art

Prior art has used frozen soil walls, established by a series of adjacent freeze pipes, to prevent environmental contaminants in a zone of soil from moving out of a volume surrounded by the frozen soil walls. The contaminated soil within the volume is then excavated for above ground treatment and removal of the contaminants. Illustrative are U.S. Pat. Nos. 4,860,544, 4,974,425, 5,050,386 to Krieg et al; PCT WO90/06480 to Krieg et al; and 5,339,893 to Haynes et al. Research on forming frozen soil walls for preventing environmental contamination is also described by some of the inventors herein in an article to be published in the Journal of Contaminant Hydrology (in press 1996), and an article in the Journal of Environmental Engineering, Vol. 122, No. 3, March, 1996. The formation of frozen soil walls is generally described in British Patent No. 958,745. This method is effective for containment, but does not solve the problem of remediation in the presence of plumes of contaminated groundwater in situ.

The prior art has described numerous in situ remediation methods. One method is referred to as the "funnel and gate system" which is described in detail by Starr et al in Ground Water 32 465–476 (May–June 1994). In this method, physical barriers (concrete, grout or sheet metal) are constructed adjacent to a gate where the treatment composition is placed in the path of a plume of water to be remediated. The placement is accomplished by digging and inserting temporary physical barriers around the gate which are removed after placement. The publication describes numerous in situ remediation methods including pH or Eh adjustment, precipitation of contaminants, sorption, biodegradation and physical methods, for instance. U.S. Pat. No. 5,416,257 to Peters describes the use of freeze walls to form a funnel; however, it is too expensive to maintain freeze walls on a long term (years) basis. Other prior art describing remediation methods includes U.S. Pat. Nos. 4,039,438 (1977) to Anderson (denitrification with anaerobic bacteria); 4,447,541 (1984) to Peterson (microorganisms and chemical treatment); 4,576,717 (1986) to Collin et al (bacterial denitrification); 4,683,064 (1987) to Hallberg et al (bacterial denitrification); 4,925,802 (1990) to Nelson et al (microbial degradation); 4,713,343 (1987) to Wilson et al (microorganisms); 4,749,491 (1988) to Lawes et al (microorganisms); 4,765,902 (1988) to Ely et al (microorganisms); 4,998,848 (1991) and 5,066,166 (1991) to Hansen (cryo-adsorption); 5,006,250 (1991) to Roberta et al (biodegradation); 5,265,674 (1993) to Fredrickson et al (vegetable oil and biodegradation); 5,300,227 (1994) to Varadarai et al (microorganisms); 5,324,137 (1994) Dash (freeze front purification); and 5,326,703 (1994) Hazen et al (microorganism). O'Hannesin et al in a presentation at the Canadian Geotechnical Society Conference, Oct. 25–28 (1992) describe the use of a metal catalyst in situ, particularly a transition metal such as iron. Witt et al at the 3rd Int. Symposium (In Situ and On Site Bioremediation) presented a paper on the use of *Pseudomonas sp.* strain KC for bioremediation. This bacterium is also described by some of the inventors herein in U.S. application Ser. Nos. 08/370,551, filed Jan. 9, 1995, 08/480,536, filed Jun. 7, 1995 and 08/267,620, filed Jun. 29, 1994, and it is particularly preferred for bacterial bioremediation in situ.

The problem is that there has been no effective method available for precise placement of a treatment composition in a zone where the remediation is to take place in the presence of flowing contaminated groundwater. Flowing water in a plume tends to move irregularly in soil and placement of the treatment composition using surface wells is difficult. Further, flowing water is difficult to dam in situ. Thus the placement of the treatment composition in situ has been less than satisfactory.

OBJECTS

It is therefore an object of the present invention to provide a novel and effective method for placement of a treatment composition in situ so that a volume of contaminated water will flow through a treatment zone containing the treatment composition. Further, it is an object of the present invention to provide a method which allows for the selection and placement of one or more of the available methods for remediation with a certainty that the contaminated water will flow through the treatment zone containing the treatment composition. Further still, it is an object of the present invention to provide a method which is relatively economical and is environmentally safe. These and other objects will become increasingly apparent by reference to the following description and the drawings.

DESCRIPTION OF PREFERRED EMBODIMENTS

Figure 1A:
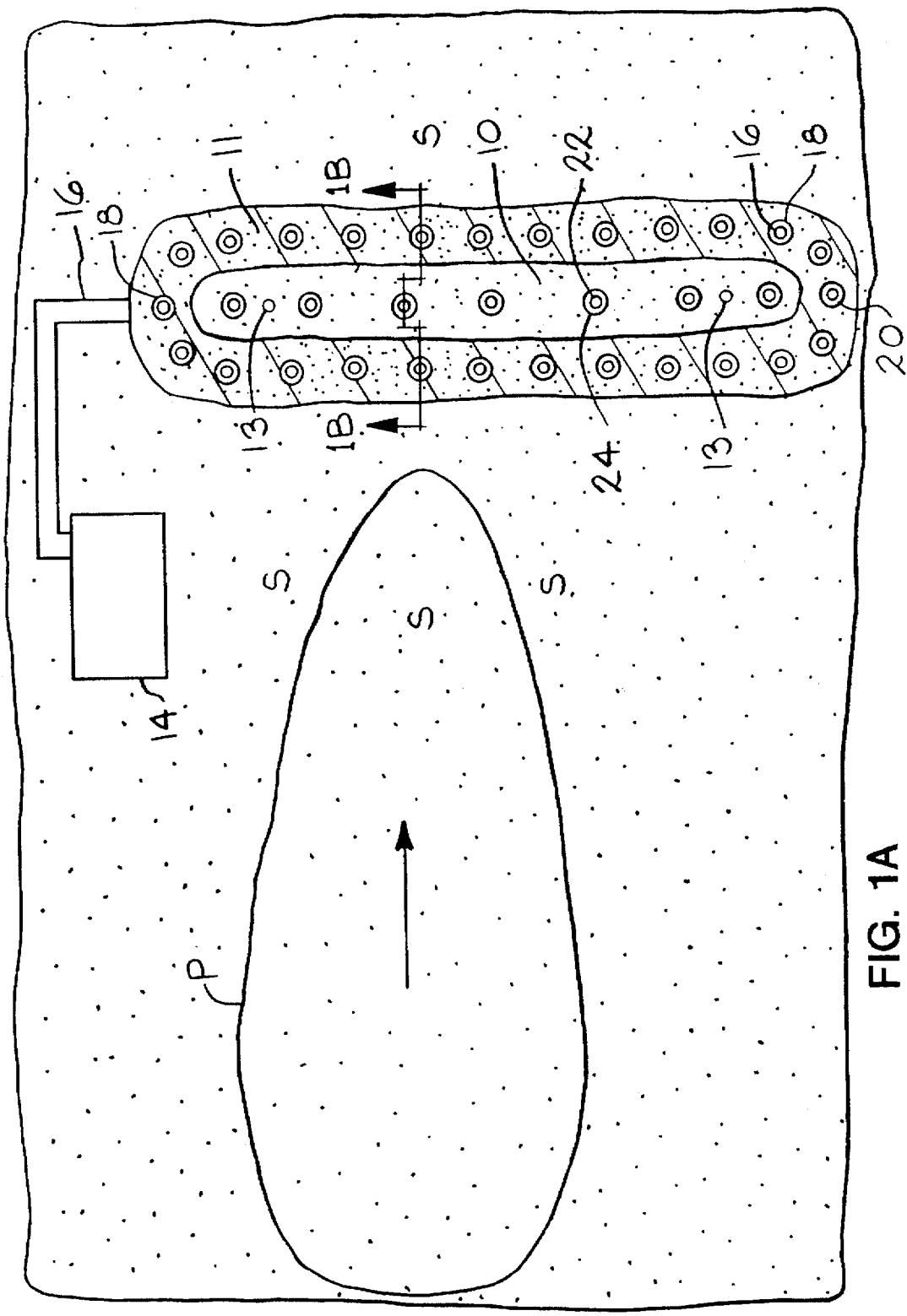
FIG. 1A is a schematic plan view showing a contaminant plume P flowing through soil S, a remediation zone 10 surrounded by frozen soil walls 11 created by freeze pipes or wells 16 and 18 where the treatment composition, such as food and nutrients for microorganisms, is to be injected into the remediation zone 10 through injection wells 13. The freeze pipes 18 are cooled by a portable refrigeration plant 14.
Figure 1B:
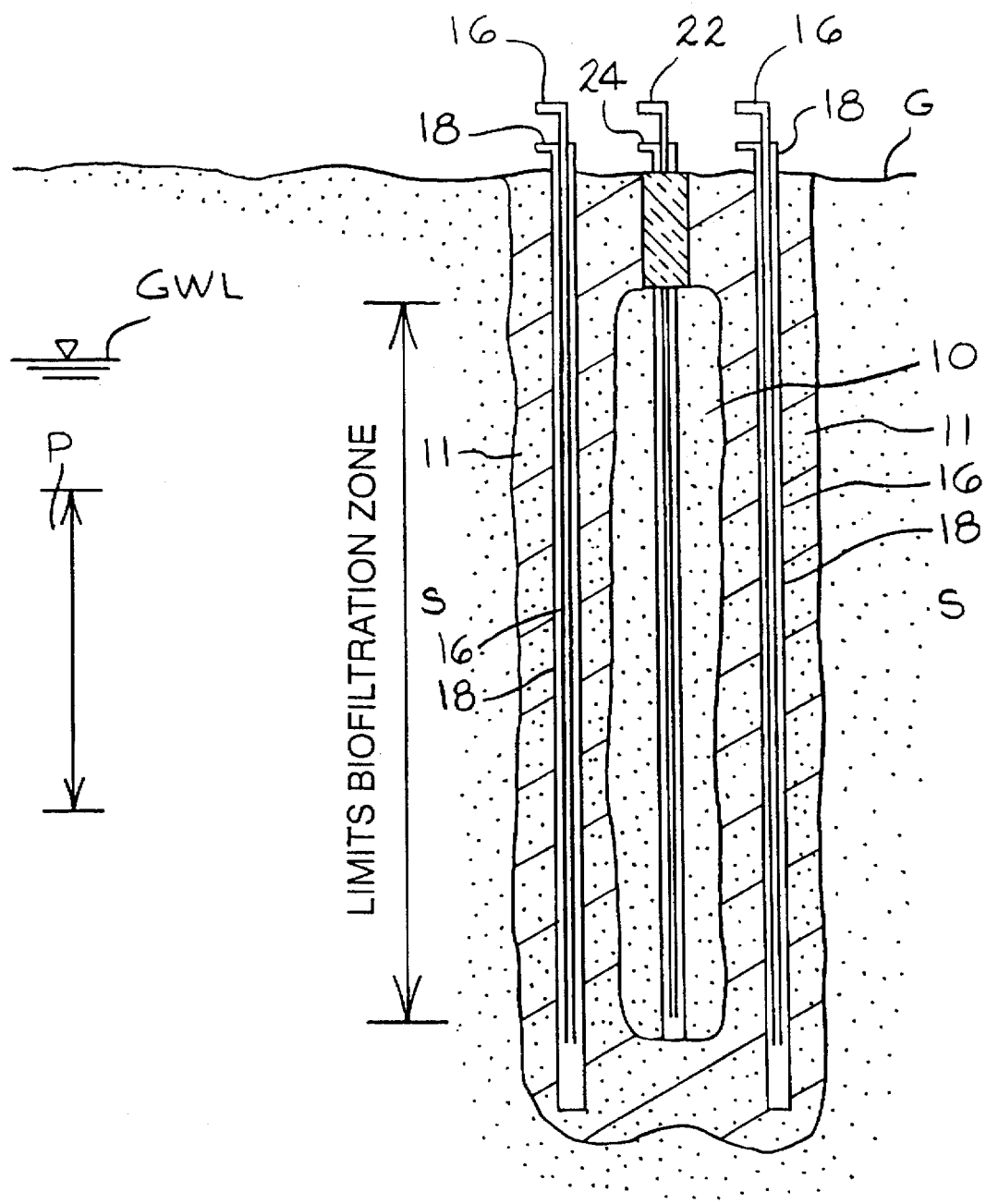
FIG. 1B is a schematic cross-sectional view of the plume and wells shown in FIG. 1A.

The present invention relates to a method for in situ removal of contaminants in a volume of flowing water in a soil or aquifer material. The invention comprises: installing a series of freeze pipes around the volume defining a treatment zone for removal of contaminants in the soil or aquifer material; freezing the soil or aquifer material around the volume; providing a remediation means in the volume; thawing at least some of the freeze pipes so that the flowing water moves through the volume allowing the treatment zone to remove the contaminants from the flowing water.

Further, the present invention relates to a method for in situ removal of contaminants from flowing groundwater in a volume of soil or aquifer material which comprises: installing a series of freeze pipes around the volume of soil or aquifer material in the path of the flowing groundwater; freezing the soil or aquifer material around the volume so as to temporarily stop flow of groundwater into the volume; introducing a treatment composition into the soil or aquifer material within the volume which facilitates removal of contaminants from the flowing groundwater; and thawing some of the freeze pipes surrounding the volume so that the groundwater containing the contaminants will flow through the treatment composition in the volume allowing contaminant removal.

Further still, the present invention relates to a method for the in situ removal of contaminants from flowing groundwater in soil or aquifer material which comprises: installing a series of freeze pipes around a volume of the soil or aquifer material in the path of the groundwater; installing a well in the soil or aquifer material of the unfrozen volume between the series of freeze pipes; freezing the soil or aquifer material around the volume so as to temporarily stop the flow of groundwater into the volume; removing water from the volume through the well; placing of a treatment composition through the well into the unfrozen soil or aquifer material; and thawing at least some of the freeze pipes so that groundwater containing the contaminants will flow through the porous reactor material.

Further, the present invention relates to a method of in situ removal of contaminants from flowing groundwater in soil or aquifer material which comprises: installing a series of freeze pipes around a volume of the soil or aquifer material in the path of the groundwater; freezing the soil or aquifer material around the volume to temporarily stop the flow of groundwater into the volume; removing soil or aquifer material from the volume to form a cavity in a path of the groundwater; placing of a permeable treatment composition in the cavity that is in the path of the groundwater; and thawing at least some of the freeze pipes so that groundwater containing contaminants flows through the porous reactor material that removes the contaminants.

The present invention also relates to a method of in situ removal of contaminants in a volume of flowing water in a soil or aquifer material which comprises: creating a water impervious barrier in the path of the volume of flowing water containing contaminants; providing a remediation means as a treatment zone in the soil or aquifer material; and at least partially removing the water impervious barrier, whereby the flowing water moves through the remediation means in the treatment zone to remove at least some of the contaminants from the flowing water. The barrier which can be at least partially removed can be grout or it can be a wall.

DEFINITIONS

Aquifer material—means porous matrix formed by particles of sand silt, cobbles or other granular material in the ground through which groundwater flows.

Bioremediation—Remediation mediated by microorganisms.

Contaminant—The term "contaminant" means composition, living or non-living, which is environmentally unwanted in soil or water.

Freeze Wall—The phrase "freeze wall" means a wall created by a series of freeze pipes which defines a volume saturated with water which is frozen, and surrounds another volume filled with a treatment composition.

Freeze—The term "freeze" means to lower the temperature to a point where water in soil freezes sufficiently to prevent flow of water in soil.

Groundwater Table (GWT)—Upper surface of the aquifer where the pore volume is filled or saturated with water.

In situ—The term "in situ" means in place.

Remediation—The term "remediation" means to change the physical condition and/or chemical composition of a contaminant in soil or water.

Soil—The term "soil" means any area (volume) in the ground which is permeable and which allows water to flow.

Treatment composition—The phrase "treatment composition" means any material which changes the composition or a physical condition of a contaminant by remediation whether by adsorption, absorption, chemical treatment or bioremediation.

Treatment or Remediation Zone—The terms "treatment zone or remediation zone" mean a volume in the ground which has been filled with a treatment composition.

Well—The term "well" means an opening in the ground which allows access to a volume below the ground.

The present invention provides a practical method for the placement of a remediation zone by creating a freeze wall around the remediation zone. The concept of creating in situ treatment zones for groundwater remediation has received considerable attention in recent years. To date, however, much of this attention has been theoretical in nature, largely because of the lack of a practical methodology for placement of a permeable remediation zone in a subsurface environment.

The method relies on the formation of a compartment with the walls frozen using freeze pipes installed at regular intervals along the periphery of the remediation zone. Activation of the freeze pipes results in the formation of an expanding cylinder of frozen soil around each freeze pipe. Eventually, the frozen soils merge to form a frozen wall. The resulting frozen wall encloses an unfrozen interior. The unfrozen interior of the compartment can be modified directly by the introduction of treatment agents or compositions through pipes or it can be excavated and backfilled with the treatment composition. The dimensions of this compartment or treatment zone are such that it can effectively intercept and remediate a migrating plume of contaminants. Where excavation is employed, special considerations must be given to structural stability of the walls adjacent to the trench forming the frozen compartment. Upon completion of the placement treatment composition, the freeze walls are thawed, reestablishing groundwater flow through the treatment zone. By leaving the freeze pipes in place, the frozen soil compartment can be recreated as needed to perform maintenance procedures on the treatment zone.

Groundwater Treatment in Subsurface Environments

A wide range of technologies are used to remove contaminants from water. Removal is typically accomplished in one of two ways: (1) by transferring the contaminants to a solid or gaseous phase, or (2) by altering the contaminants chemically, electrolytically, or biologically. These processes form the basis for water purification technologies, and their proper function is essential to the success of cost effective remediation strategies. Unfortunately, control over such process in situ is severely limited by the heterogeneity and lack of hydraulic control commonly found in subsurface environments. Furthermore, many treatment processes require periodic chemical addition or some type of maintenance operation to retain a high removal efficiency. Such operations can be difficult or impossible to conduct in situ.

Installation of treatment technologies in subsurface environments is not accomplished in any simple or obvious manner: direct introduction of treatment agents, such as microorganisms, chemicals, or sorbents, can be achieved by pumping, but treatment agents introduced in this manner may be distributed in a highly non-uniform manner due to the heterogeneity of the soil. As a result, much of the contaminated water does not come into contact with the treatment agent and will not be treated. To establish a reliable in situ treatment zone, a method is needed whereby a soil volume can be isolated hydraulically, and modified by addition of appropriate treatment agents. This suggests the need for a temporary barrier. The barrier must be removable so that after a treatment zone has been established, a contaminant plume can migrate into and through the treatment zone. The method of the present invention is to freeze a region of saturated aquifer solids surrounding the desired treatment zone.

Figure 5A:
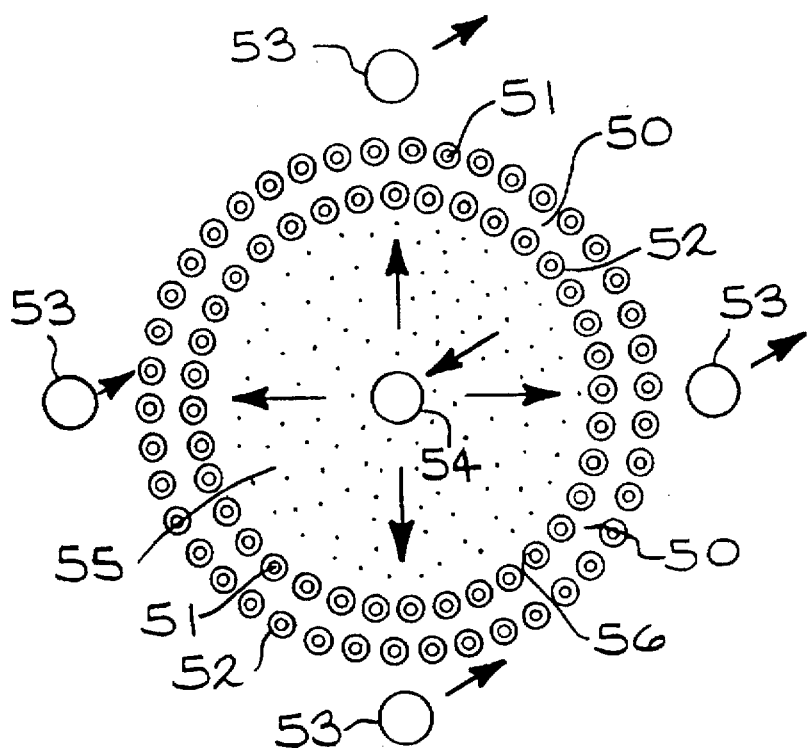
FIG. 5A is a schematic plan view showing freeze pipes 51 and 52 forming a double ring of frozen walls 56, confining a remediation zone 50, extraction wells 53 and a re-injection well 54 and a contaminant spill 55.
Figure 5B:
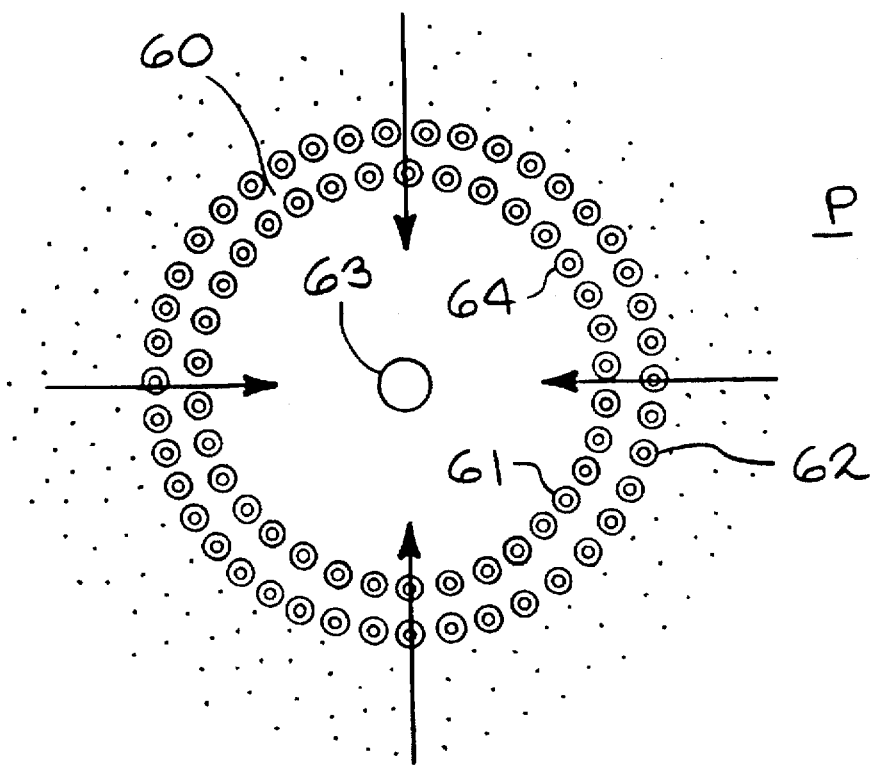
FIG. 5B is a plan view showing freeze pipes 61 and 62 forming a double ring of frozen wall 64, an extraction well 63 inside a remediation zone 60, with a contaminated groundwater outside the zone 60.

Referring to FIGS. 1A, 1B, 2A, 2B, 3A and 3B, frozen walls 11 are created surrounding a soil compartment for in situ placement of treatment zones within the soil compartment creating an in situ treatment zone 10. A treatment agent or composition must be placed in front of a moving contaminant plume P flowing through soil S in the treatment zone 11. The plume P can be flowing under the influence of a natural hydraulic gradient or it may be pulled through a treatment zone 50 by pumping as shown in FIGS. 5A and 5B and discussed hereinafter. The treatment zone 10 must extend vertically and horizontally for distances sufficient to insure that all contaminated groundwater in the plume P passes through it. The thickness of the treatment zone 10 in the direction of groundwater flow is determined by the plume P velocity, nature and mass of contaminants to be removed, type of treatment process, and the anticipated maintenance schedule or design life. The plume is in the ground below the groundwater table (GWT).

Established ground freezing methods are used to create a compartment defined by a frozen wall 11 with temporary top, sides, ends, and bottom (if needed). A clay layer, if located close to or at the bottom of the treatment zone 10, can serve in place of frozen soils. The frozen walls 11 (freeze sides) are created by installation of vertical freeze pipes 16 and 18. All of the freeze pipes 16 and 18 are connected to a refrigeration plant 14 (one connection shown) by feed and return manifolds (not shown) at the ground surface G. Within each of the freeze pipes 16 and 18, a cooling fluid circulates down an inner pipe 16 and returns within the annular space 20 between the pipe 16 and pipe 18. Pipes 16 and 18 are placed to the desired depth below the contaminant plume P. The spacing of pipes 16 and 18 is selected so as to give a reasonable freeze time for the several variables—freeze pipe 16 and 18 diameter and temperature, and soil S thermal properties. A typical spacing would be approximately one meter. Heat extraction from the soil S adjacent to freeze pipes 16 and 18 causes frozen soil columns to form around each pipe. With continued heat extraction, the frozen soil columns increase in diameter until they merge and form a frozen wall 11. For freeze pipes 16 and 18, the freezing process requires 2-3 weeks, depending upon soil S characteristics, spacing of freeze pipes 16 and 18, and temperature. A reduction in the heat extraction rate at this time and/or optional placement of heat pipes 22 and 24 between the two walls 11 formed by pipes 16 and 18 serves to maintain an unfrozen soil compartment or zone 10. Temperature sensors (thermocouples; not shown) placed in boreholes between freeze pipes 16 and 18 provide data useful in controlling limits of ground freezing. With no heat input and continued heat extraction at the bottom and ends, more soil freezes and the remediation zone is enclosed in a chamber defined by frozen walls 11 consisting of frozen soil sides, ends, and if necessary, a top and a bottom. Freezing of the water in water saturated soils creates a compartment with a frozen wall 11 which is impervious to fluid movement. Movement of the contaminant plume P is temporarily blocked by the frozen sides of the frozen wall 11 defining the zone 10 during this period. This allows establishment of the treatment zone 10 within the unfrozen soil compartment. After establishment of the treatment zone 10, the frozen wall 11 is allowed to thaw, and water flow is reestablished. Contaminated groundwater passing through the treatment zone 10 is remediated. In the following sections, two general options are described for placement of treatment zones 10 within the frozen wall 11 defined compartment: a) modification of the treatment zone 10 by in situ treatment (without excavation), and (b) modification of the compartment interior by excavation and introduction of appropriate treatment composition.

In Situ Modification of the Treatment Zone (No Excavation)

In one remediation configuration, soil within the frozen soil compartment or zone 10 is dewatered by pumping and the appropriate treatment agents are introduced at the bottom of the compartment or zone 10 by wells. As the treatment agents are introduced into the treatment zone 10, air is displaced upward and out of the compartment zone 10 preferably through wells. Water flushing and permeability tests can be conducted to insure that the resulting zone 10 is sufficiently permeable to water. Once a satisfactory treatment zone 10 is established, the frozen soil sides, bottom, and ends forming the frozen wall 11 are allowed to thaw, permitting movement of the contaminant plume through the treatment zone 10. Thawing of the wall 11 may be accelerated by circulation of a warm fluid through the freeze pipes 16 and 18. Should the need arise for recreating the frozen soil compartment, the freeze pipes 16 and 18 can be reactivated by reintroduction of a coolant. For example, if the treatment zone 10 capacity should become depleted or the permeability reduced, the frozen wall 11 can be reformed and the treatment zone 10 recharged or flushed. Thawing of the frozen wall 11 leaves the treatment zone 10 intact and regenerated. Three possible in situ modifications are described in the following Examples.

EXAMPLE 1

Establishment of a Treatment Zone for Removal of Nitrate and/or Halogenated Organic Contaminants Using Vegetable Oil and Microbial Activity After hydraulically isolating a soil mass using the freeze wall 11, vegetable oil is introduced as in U.S. Pat. No. 5,265,674 to Fredrickson et al. The objective of this effort is to trap the oil within the space between soil grains. Slowly dissolving entrapped oil creates a curtain that extracts contaminants from the water and sustains long-term biodegradation. The simplest means of introducing oil is sequential displacement of the fluid contained within the frozen wall 11 defined compartment or treatment zone 10. In the first displacement, water is removed and air is allowed to fill the drained pore space. Next, oil is pumped in and the air allowed to flow out. These two steps insure that oil has access to pores throughout zone 10. In the last stage, water is pumped into the zone 10 and mobile oil is allowed to flow out. This step is necessary to develop sufficient permeability to water in the curtain prior to thawing of the frozen wall 11. Where fluctuating water tables could cause redistribution of oil, oil adsorbing materials are employed to prevent oil movement. At the same time as water is pumped into the chamber to ensure permeability, microorganisms and slow release nutrients (nitrogen and phosphorus) can be introduced into the unfrozen soil within the zone 10. The added organisms are pre-adapted for growth on vegetable oil and capable of anaerobic biodegradation of halogenated organics. Over time, populations of native microorganisms typically become sufficiently numerous for treatment, but, in some cases, the time required for this growth may be excessive. Addition of organisms reduces or eliminates the lag time required for initiation of treatment. Addition of preadapted microorganisms may also be desirable where the indigenous organisms are inhibited by toxic contaminants, produce unwanted degradation products, or exhibit excessively slow transformation kinetics.

Anaerobic biodegradation of halogenated organics proceeds by "reductive dechlorination", a process in which chlorine is removed and replaced by hydrogen. This process occurs naturally at sites where food is abundant, such as landfills or anaerobic digesters. Reductive dechlorination typically results in the production of dechlorinated molecules that are more susceptible to aerobic oxidation. In general, the products of anaerobic dechlorination are either harmless molecules, such as ethylene or ethane, or they are less toxic than the parent compound. Methanol, ethanol, benzoate, acetate, lactate and amino acids have all been used as food sources for reductive dechlorination. These substances are all highly soluble, and must be supplied continuously or repeatedly to sustain microbial activity. Use of free phase vegetable oil as the primary substrate for microbial growth overcomes this problem. By virtue of its limited solubility, vegetable oil slowly dissolves in water, resulting in a time-release of growth substrate and facilitating sustained transformation of the target contaminants. A further advantage of vegetable oil is its hydrophobicity which enables it to extract hydrophobic contaminants from water. Subsequently, as oil containing extracted contaminants dissolves into the water phase, it is consumed by microorganisms capable of degrading the contaminants.

EXAMPLE 2

Establishment of a Treatment Zone for Removal of Heavy Metals by Ion Exchange

After hydraulically isolating a soil mass with a freeze wall 11, water within the zone 10 is removed, and a soil modifier such as a quaternary ammonium cation or a quaternary phosphonium cation is introduced into the zone 10 to alter the ion exchange properties of silica surfaces as described in U.S. Pat. No. 5,268,109 to Boyd. The additive is allowed to react for sufficient time to enhance the ion exchange properties of the soil. The additive is then removed from the chamber or zone 10 by displacement with groundwater, and the frozen walls 11 are allowed to thaw. Once the ion exchange capacity of the soils is exhausted, the frozen soil walls 11 can be reformed and the ion exchange capacity of the treatment zone 10 regenerated.

EXAMPLE 3

Establishment of a Treatment Zone for Removal of Pathogens

After hydraulically isolating a soil mass with the frozen wall 11, a slow release disinfectant is introduced into the treatment zone 10. Alternatively, a non-pathogenic microbial community is established by introduction of slow-release organic substrate within the treatment zone 10, as per Example 1. Viruses, bacterial pathogens, protozoal pathogens, or pathogenic worms that are transported with the groundwater flow are removed as they pass through the disinfection treatment zone 10 or as they interact with the non-pathogenic microbial community. The removal can also be the result of direct chemical modification and inactivation of the pathogen due to changes in solution chemistry or it can be due to antagonistic interactions between the pathogen and the non-pathogenic microbial community.

Modifications of the Treatment Zone by Excavation and Backfilling

In a second general configuration of the invention, preparation of the treatment zone 10 can be facilitated by removal (excavation) of unfrozen soil within the treatment zone 10 and replacement with a more suitable treatment material or composition. This includes, but is not limited to permeable materials, treatment agents (microorganisms, abiotic catalysts, sorbents, ion exchange materials, etc.) slow release microbial substrates, bulking agents to enhance permeability, or prefabricated filtration blankets. Pipes (not shown) for the introduction of or removal of gases can also be installed at various levels surrounded by high permeability materials. The contaminant plume will move more readily through this remediation zone 10 as it possesses greater permeability than the adjacent soil.

Figure 2A:
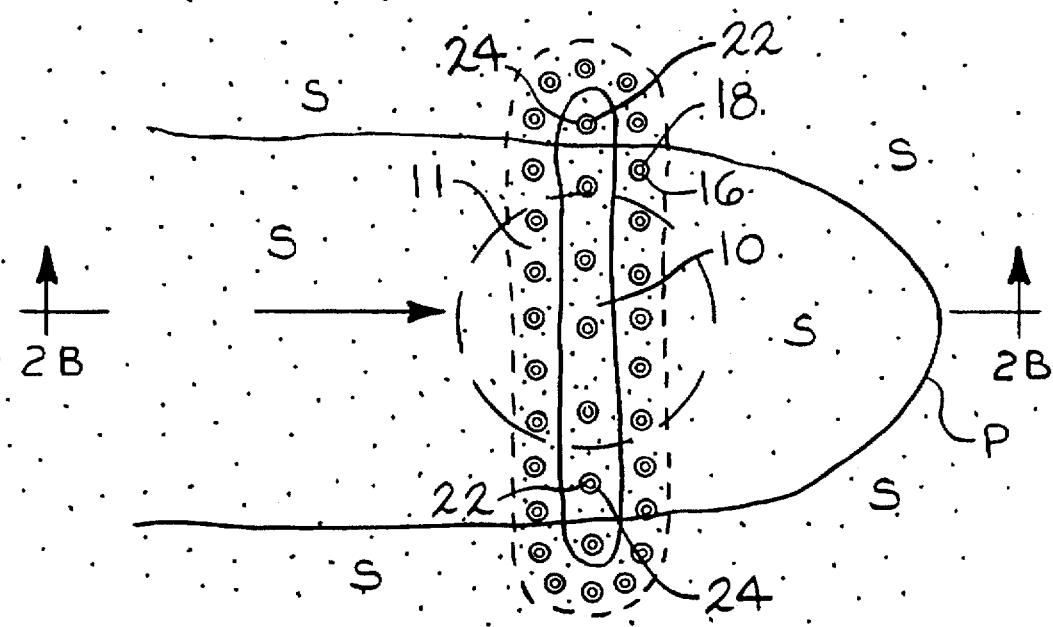
FIG. 2A is a plan view showing the remediation zone 10 of FIG. 1A wherein the frozen walls 11 have been thawed. The existing soil in the remediation zone 10 has been conditioned for the remediation or it has been excavated and replaced with a permeable treatment composition. The contaminated water is remediated upon passage through the remediation zone.
Figure 2B:
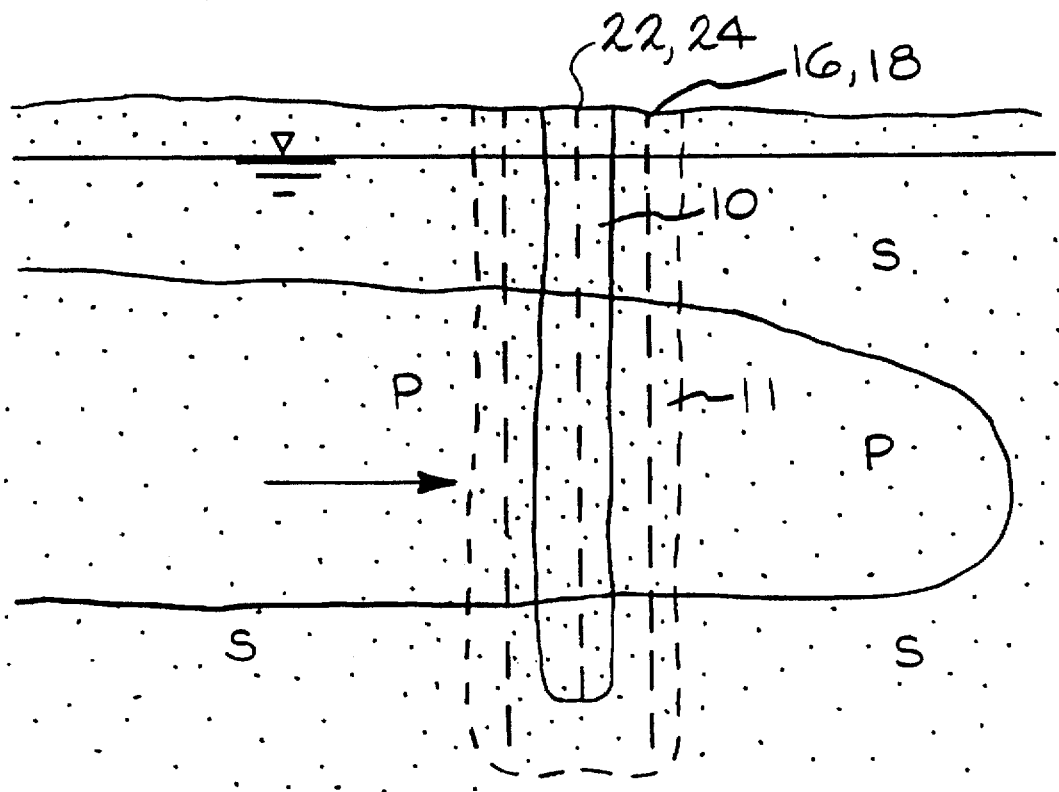
FIG. 2B is a cross-sectional view along line 2B—2B of FIG. 2A.
Figure 3A:
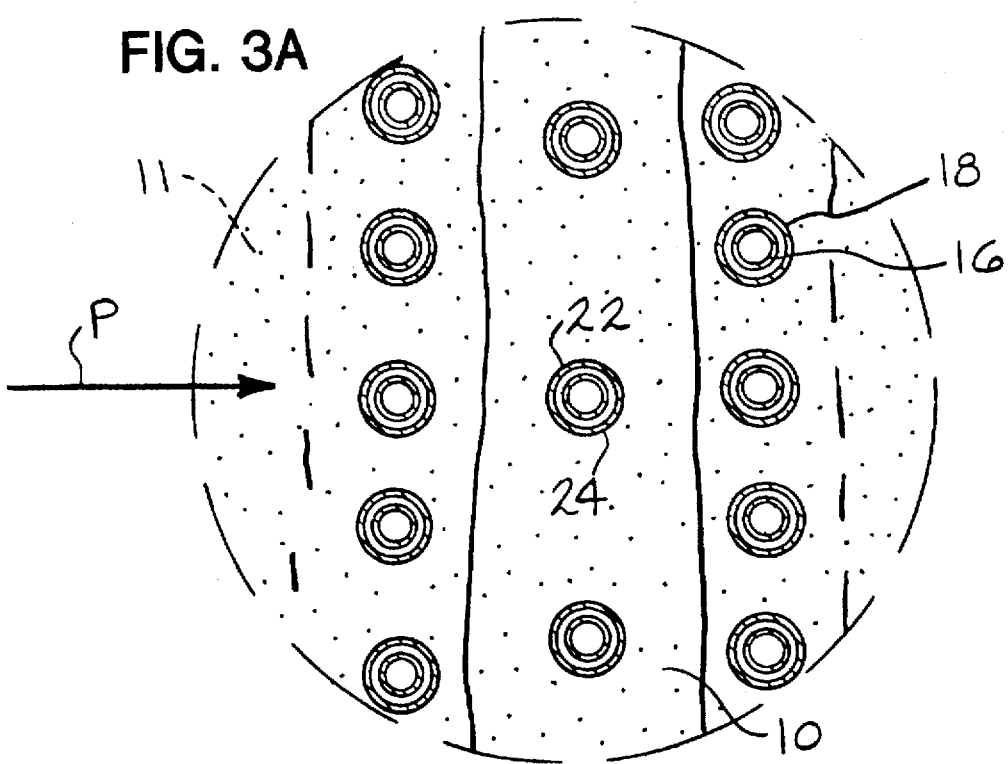
FIG. 3A is an enlarged plan view of a section of FIG. 2A.
Figure 3B:
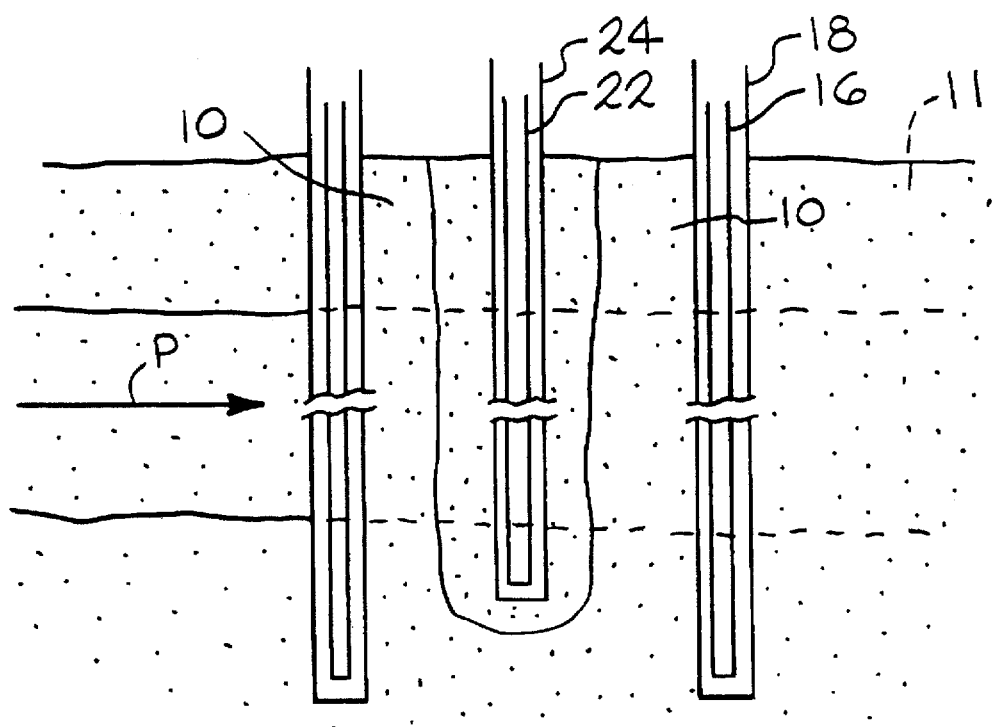
FIG. 3B is a cross-sectional view of the enlarged section of FIG. 3A.
Figure 4A:
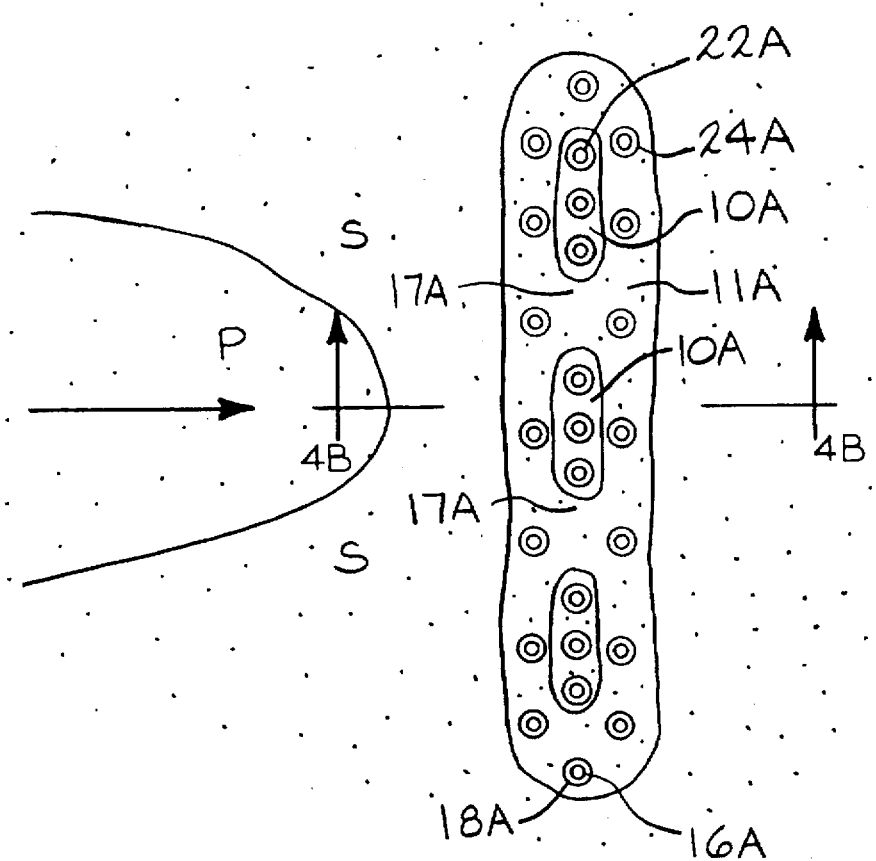
FIG. 4A is a plan view showing freeze pipes 16A and 18A forming a freeze wall 11A confining multiple remediation zones 10A in front of a contaminant plume P.
Figure 4B:
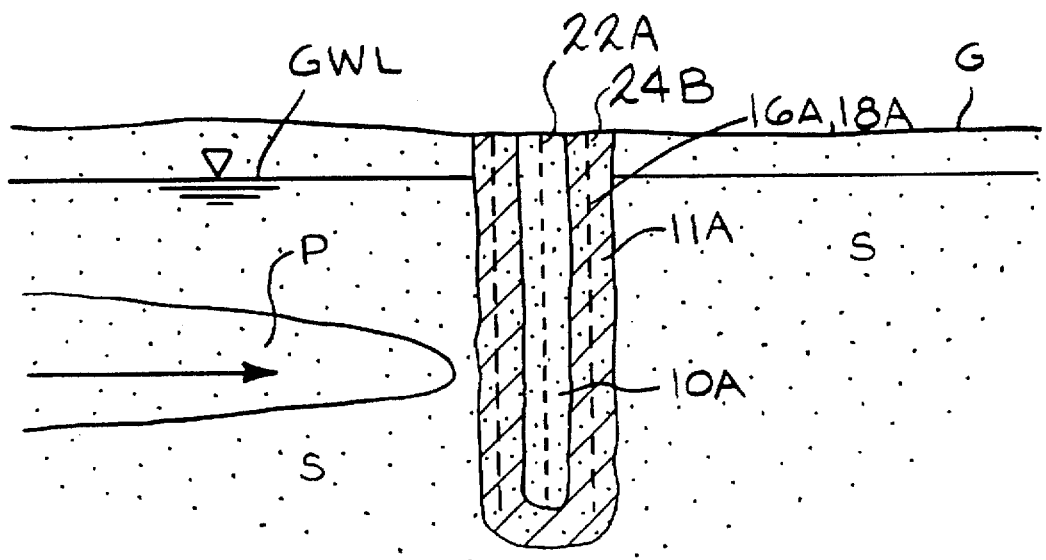
FIG. 4B is a cross-section along line 4B—4B of FIG. 4A.

Excavation of unfrozen soil within the frozen soil zone or frozen wall 11 requires modifications to prevent inward movement of side walls due to lateral soils and water pressures. Frozen soil has a high flexural strength which will allow excavation of a relatively wide area between the sides or frozen walls 11 as illustrated in FIGS. 1A and 2A. Selection of this span length is based on structural analysis using limiting frozen soils properties and lateral pressure representative for each site. A short section 17A as shown in FIG. 4A of frozen soils at the ends of each excavation area or treatment zone 10A serves to transfer loads to the opposite side wall 11A. Since frozen soil has a high compressive strength, the width of this load transfer section 17A is small. To reduce soil permeability, each load transfer section 17A is grouted before freezing. On thawing the side walls 11A and load transfer sections 17A, groundwater will flow around the grouted sections and through the treatment zones 10A. The grouted sections 17A thus function as impermeable barriers or "funnels" resulting in a rerouting of flow through the treatment zones. Alternatively, sections of the freeze wall 11A can be curved to increase their ability to withstand external loads. Construction of the box-like frozen soil compartment or walls 11A, with or without removal of unfrozen soil can be scheduled in different ways depending upon the contractor's equipment. Use of grouted cylinders to provide structural support provides a subdivision of the treatment zones 11A into separate cells, separated by impermeable regions or sections 17A. The use of such columns or cells is advantageous for maintenance operations inasmuch as isolated cells can be refrozen and restored as needed without the need to refreeze over the entire treatment zone.

In the following sections, examples of freeze wall placement technology are disclosed in which a trench, cavity or shaft is excavated inside the frozen soil compartment defining the treatment zone 10 or 10A.

EXAMPLE 4

Establishment of a Sorbent Barrier: Excavation of Dewatered Soil by Trenching and Backfilling with Permeable Soils Containing Modified Clays Certain organically modified clay materials are capable of adsorbing organic contaminants, such as the BTEX (benzene, toluene, ethylbenzene, xylene) class of contaminants. Backfilling with a soil composed of soil and a small amount of clay enables the creation of a strongly sorbing yet permeable treatment zone 10. Contaminants trapped within these regions are susceptible to biological degradation by indigenous microbial communities under conditions of adequate nutrients and electron acceptors (oxygen and nitrate). Pipes (not shown) installed at various desired levels within the trench are used to deliver nutrients and or oxygen continuously or periodically in order to maintain the capacity of the treatment zone 10.

EXAMPLE 5

Establishment of a Sorbent Barrier: Excavation of Dewatered Soil by Trenching, Installation of an Adsorbent Membrane, and Backfilling with Permeable Soils Porous membrane materials can be prefabricated with desirable properties with respect to ion exchange, biodegradability, sorptivity, tensile strength, and permeability to water. Sheets of these membranes can be extended down into excavated trenches in the treatment zone 10, then surrounded with permeable backfill materials.

EXAMPLE 6

Establishment of an Electrolytic Barrier: Excavation of Dewatered Soil by Trenching, Installation of Cathode and Anode Rods or a Membrane Containing Electrolytic Fibers, and Backfilling With Suitable Materials Porous membrane materials can be prefabricated with electrically conductive fibers. Sheets of these membranes can be extended down into excavated trenches in the treatment zone 10, then surrounded with permeable backfill materials. Alternatively, cathodic and anodic rods can be implanted. The electrolytically conductive fibers or rods are connected to a power supply at the ground surface. Contaminants susceptible to electrolytic action are either destroyed or drawn by electro-osmotic flow to isoelectric collection points as water flows past the electrolytically active region in the treatment zone 10.

EXAMPLE 7

Establishment of a Treatment Zone for Removal of Heavy Metals by Ion Exchange: Excavation of Dewatered Soil by Trenching and Backfilling With Ion Exchange Media Heavy metals can be removed by ion exchange resins. Resin beads or sand treated to alter ion exchange properties can be backfilled into the excavated trench in the treatment zone 10 between the frozen walls 11. Once the ion exchange capacity of the soils is exhausted, the frozen walls 11 can be reformed and the ion exchange capacity of the treatment zone regenerated.

EXAMPLE 8

Establishment of a Treatment Zone for Removal of Halogenated Organic Compounds by Reductive Dechlorination Using Iron Powder: Excavation of Dewatered Soil by Trenching and Backfilling With Iron Powder/Soil Mixture Iron powder reductively dechlorinates highly halogenated molecules. A reactive iron powder curtain is created by backfilling the trench forming the treatment zone 10 with a mixture of iron powder and other permeable materials. The amount of iron powder added must be sufficient to consume completely the halogenated organics present in the groundwater. Should the permeability of the aquifer materials be adversely affected by ferrous ion precipitates, the soil frozen walls 11 can be reformed and maintenance operations performed to remove the accumulated precipitates and restore permeability.

EXAMPLE 9

Establishment of a Treatment Zone for Removal of Volatile Organics by Bioventing or Air Sparging: Excavation of Dewatered Soil or Aquifer Material by Trenching and Backfilling Over Gas Injection Lines With High Permeability Materials Addition of gases to subsurface environments can provide numerous benefits. A wide range of organic contaminants are volatile and can be stripped from the water phase by air sparging. Aerobic biodegradation is also enhanced by the addition of oxygen and other gases. Hydrocarbons can be removed by adding oxygen to stimulate indigenous aerobic organisms. Many halogenated hydrocarbon contaminants are degraded by stimulating growth of microorganisms that consume oxygen and methane gas. To provide these benefits, gas lines are installed at different elevations within the trench providing the treatment zone 10. Vapors emerging from the zone 10 can be captured and further treated, if necessary. Characteristics of the permeable backfill can be designed to control distribution of vertical air flow channels and air-water interfacial contact area.

EXAMPLE 10

Establishment of a Treatment Zone for Removal of Pathogens: Excavation of Dewatered Soil or Aquifer Material by Trenching and Backfilling over Disinfectant Injection Lines Surrounded by High Permeability Materials After excavation of a cavity between the freeze walls 11, water within the zone 10 is removed, and injection lines (not shown) laid for the introduction of a disinfectant into the treatment zone 10. Alternatively, a biological community is established by installation of substrate and nutrient supply lines to stimulate the growth of organisms that are antagonistic to the pathogens. Viruses, bacterial pathogens, protozoal pathogens, or pathogenic worms that are transported with the groundwater flow are removed as they pass through the disinfection zone. Pathogen removal can be the result of direct chemical modification and inactivation of the pathogen or it may be due to antagonistic interactions between the pathogen and the non-pathogenic microbial community.

EXAMPLE 11

FIG. 5A shows a tubular or ring shaped remediation zone 50 formed by freeze pipes 51 and 52 which produce frozen walls 56. Extraction wells 53 are provided to drain water containing contaminants from a spill 55 through zone 50. The treated water is injected through re-injection well 54.

EXAMPLE 12

FIG. 5B shows a treatment zone 60 produced using freeze pipes 61 and 62 which produce frozen walls 64. An extraction well 63 is used to drain water from a plume P through zone 60.

EXAMPLE 13

Figure 6:
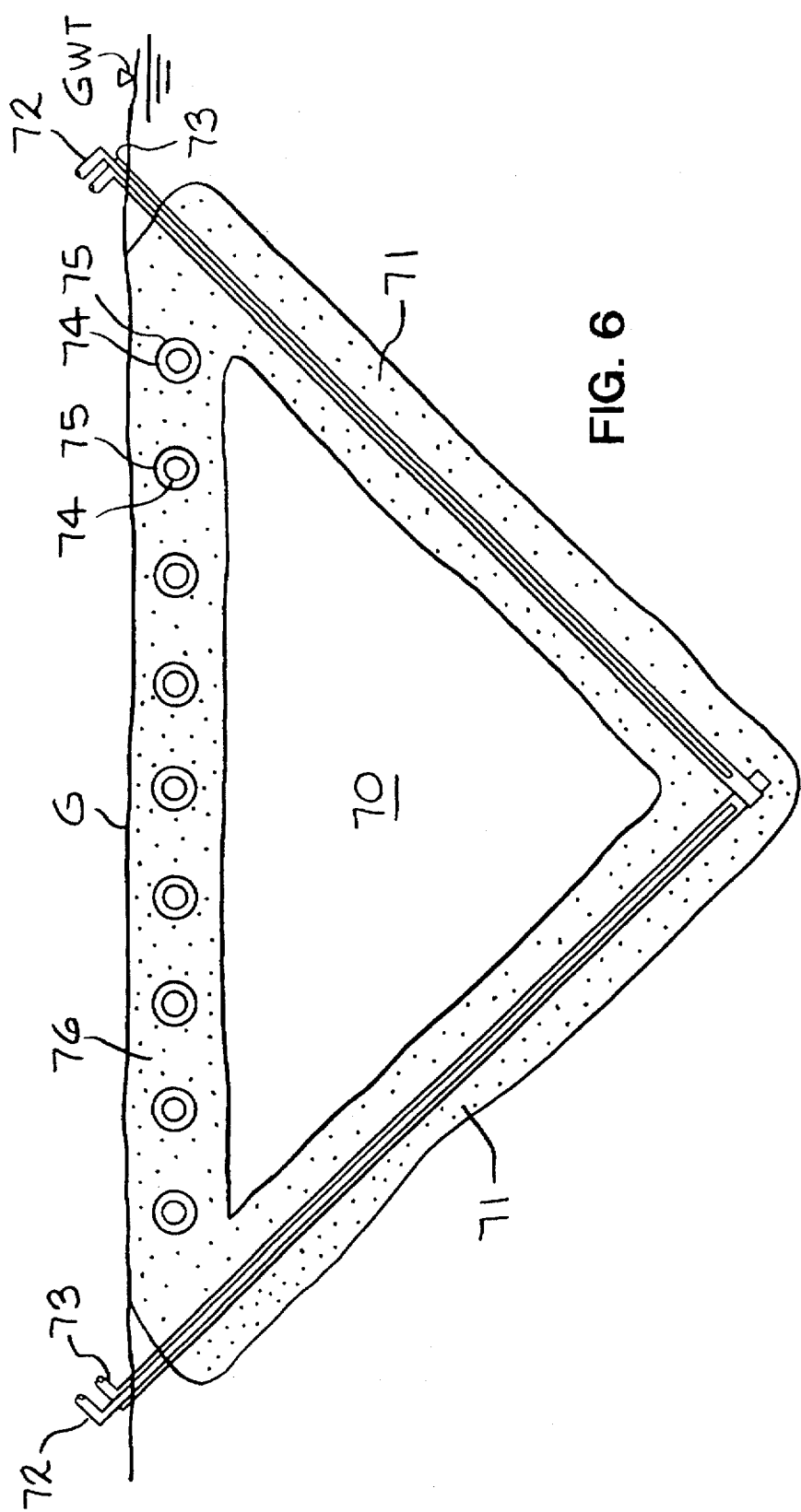
FIG. 6 is a front cross-sectional view showing V-oriented freeze pipes 72 and 73 forming freeze walls 71 for establishing treatment zone 70. Horizontal freeze pipes 74 and 75 establish horizontal freeze wall 76 as a cap.

FIG. 6 shows freeze pipes 72 and 73 which are positioned in a V-shape to form freeze walls 71 in the form of a trough confining treatment zone 70. Optionally, horizontal freeze pipes 74 and 75 form a frozen wall 76 as a cover or cap.

EXAMPLE 14

Figure 7:
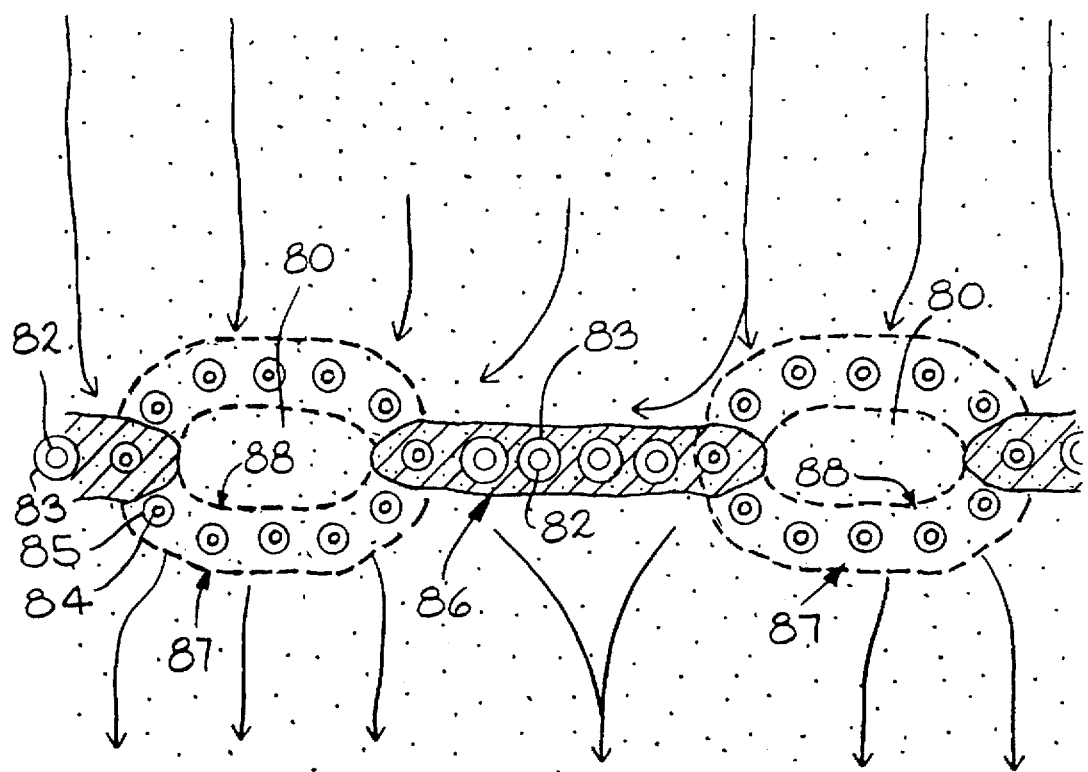
FIG. 7 is a schematic plan view showing a gate and funnel system using bore holes 82 to provide grout 83 for barrier 86 and freeze pipes 84 and 85 for the gate forming temporary frozen soil wall 87.

A freeze wall as shown in FIG. 7 is created (preferably at a depth of greater than 15 meters in deep aquifers) by pipes 84 and 85 and is used to create a remediation zone 80 as a gate in a funnel and gate method. A barrier 86 is created by injecting grout into bore holes 82 and 83 in a known manner. Because of curvature of cylinder frozen walls 87 and 88 formed by pipes 84 and 85, material can be removed to great depth (this has been done to over 200'). Thus it is possible to install complex treatment compositions at great depths where dense non-aqueous liquids (DNAPLS) are often present in saturated media. The zone 80 is preferably an ellipse where 2W<L (L=length and W=width). The funnel or barrier 86 can be constructed using grout, sheet piling, membranes or other liquid impermeable materials.

EXAMPLE 15

Figure 8:
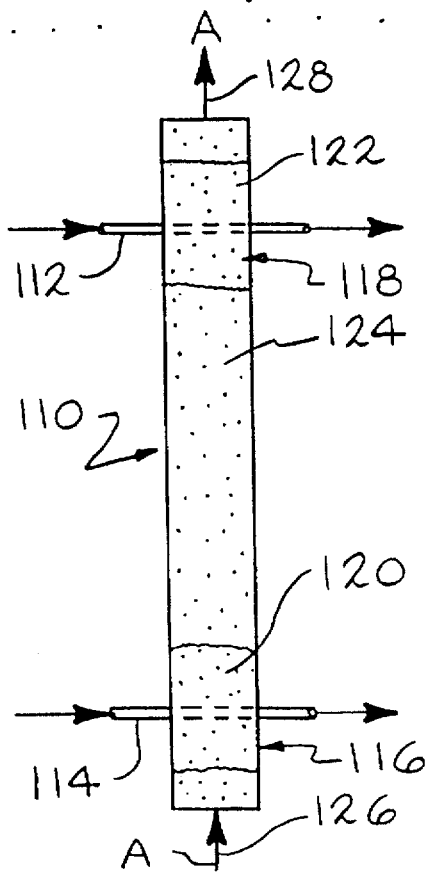
FIG. 8 is a schematic view of a cylindrical laboratory column 110 used with freeze walls 120 and 122 for forming remediation zone 124.

This example and FIG. 8 show a chamber or treatment zone 124, filled with an aquifer derived porous medium and produced by temporarily freezing the surrounding soil, and by modifying the unfrozen interior region by introduction of desired treatment agents. Subsequently, the surrounding soil was thawed, allowing treatment of contaminated groundwater as it passes through the altered region.

In order to simulate one-dimensional aquifer flow, two one-meter-long by 76-mm-diameter test columns 110 (cells A and B) were fabricated from translucent plastic (PVC) as shown in FIG. 8. Granular soil was obtained from a contaminated site in the field, and was packed into the columns 110. The columns 110 were saturated with water. Flow characteristics of each column 110 were obtained by using tritiated water as a conservative tracer. The groundwater velocity was 300 mm/day. No short-circuiting or channeling of the flow was observed, indicating that a continuous porous medium existed within the column 110.

Figure 9:
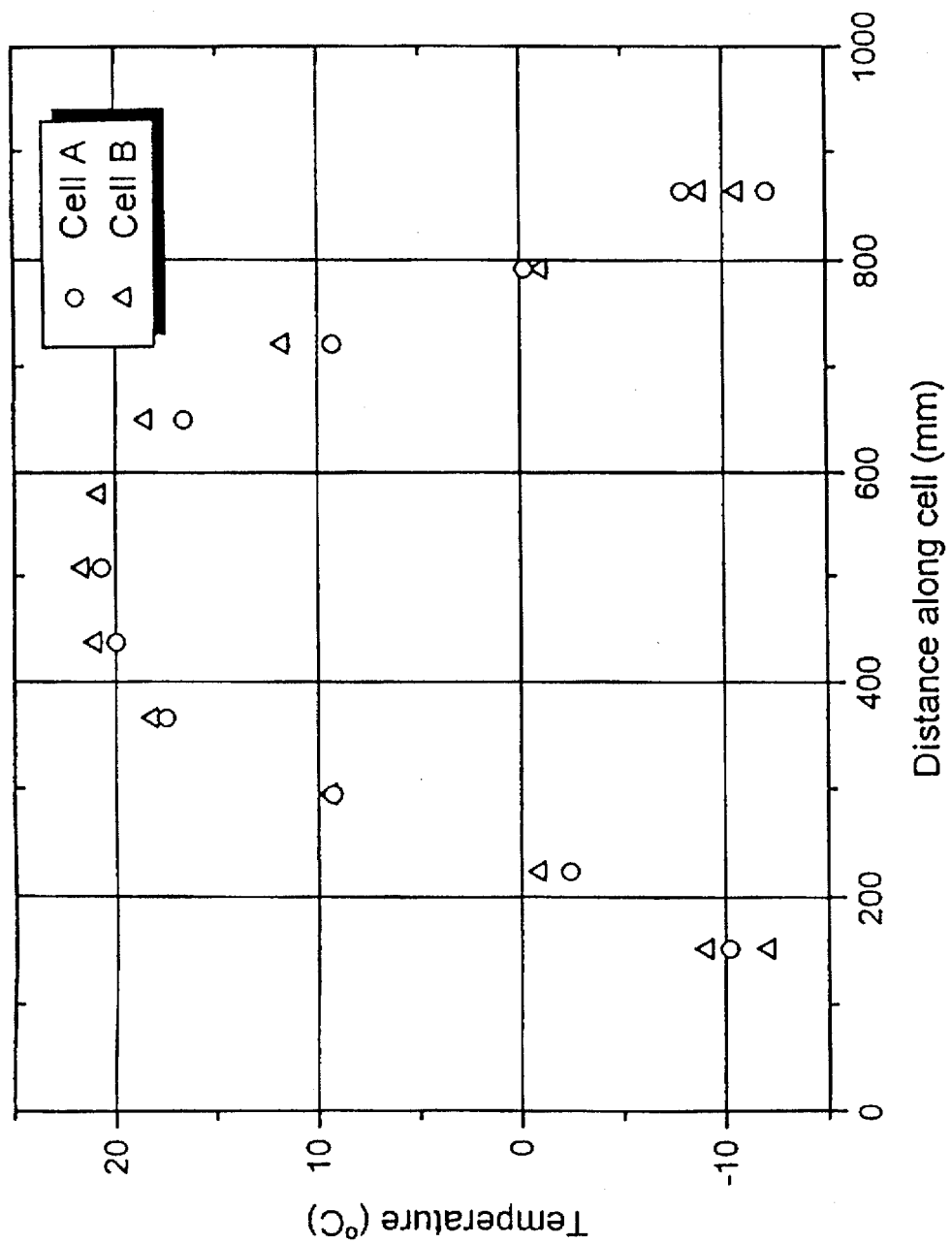
FIG. 9 is a graph showing columns 110 (cells A and B) and temperatures along the length of the column 110 during the formation of freeze walls 122 and 124.

One column 110 is described. The groundwater flow was stopped, and coolant at −15° C. was pumped through freeze pipes 112 and 114 located at each end 116 and 118 of each column 110 until the soil in the regions 120 and 122 in the ends of the column 110 became frozen. The thickness of the frozen soil 120 and 122 was approximately 150 mm along the axis A—A of the column 10. The regions 120 and 122 of each cell near the freeze pipes 112 and 114 were insulated (not shown), and the unfrozen soil volume in region or treatment zone 124 between the freeze pipes 112 and 114 was left exposed to ambient temperatures. Column 10 temperatures were monitored using thirteen thermocouples (not shown) in each column 110. The soil temperature in zone 124 stabilized in one day as shown in FIG. 9. Subsequent to freezing, the 510-mm-long interior chamber or zone 124 of unfrozen soil region was pressure tested at 34 kPa for 93 minutes and no detectable leakage was observed.

With the frozen soil in regions 120 and 123 in place, a representative remediation scheme was initiated in each column 110. In both columns 110 a trapped, or residual, volume of corn oil was placed into the central unfrozen core region 124. This mass of oil provided a nutrient substrate (source of carbon) for the microbes that were to subsequently remediate flowing pore water contaminated with carbon tetrachloride. Each column 110 had approximately 30% of the pore space occupied by the oil; the remainder of the pore space was occupied by water. After placement of the oil residual, one of the cells (cell A) was inoculated in the interior unfrozen region providing zone 124 with the microbe *Pseudomonas stutzeri* KC (DSM culture collection 7136) as described in Ser. No. 08/062,072, filed May 14, 1993 by some of the inventors. This bacterium is known to rapidly reduce carbon tetrachloride to carbon dioxide and nontoxic, nonvolatile byproducts. The second column 110 (cell B) was not inoculated; instead, it served as a control where the indigenous microbes present in the pore water or soil in region 124 were allowed to colonize and transform the carbon tetrachloride.

Following initial preparation, the frozen soil barriers in regions 122 and 124 were thawed, and the flow of water was commenced at a velocity of 300 mm/day between inlet 126 and outlet 128. The contaminant, carbon tetrachloride, was added to the pore water supply at a concentration of 100 parts per billion. In addition, the pore water supply was adjusted to a pH of 8.2 and a supplemental nutrient was added. A mass of tritiated water was injected initially to demonstrate the breakthrough of a nonreacting, nonabsorbing tracer. In both columns 110, the coolant temperature was raised, and the coolant pipes 112 and 114 were rerouted to maintain each column 110 at approximately 15° C., thereby simulating groundwater temperatures.

Figure 10A:
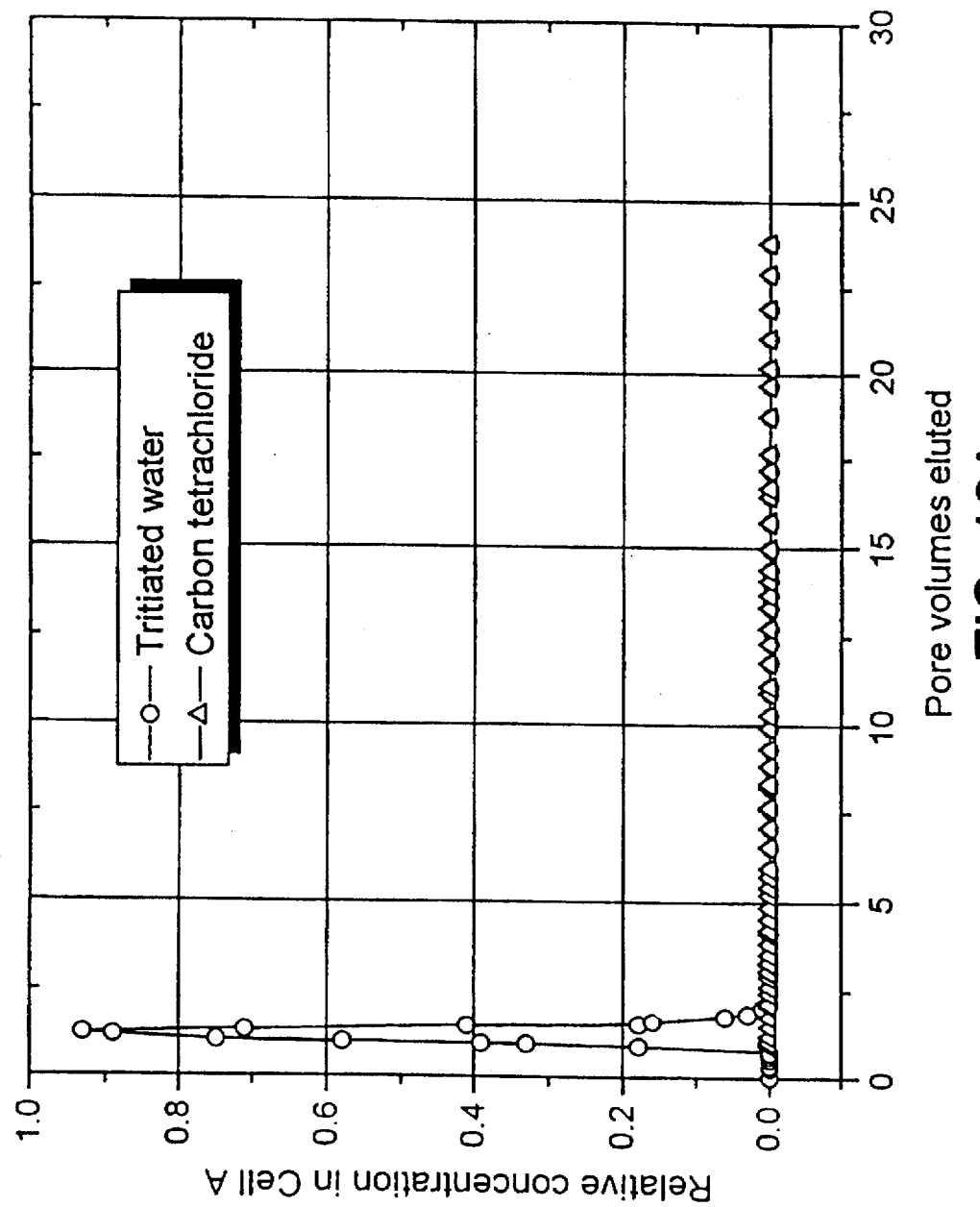
FIGS. 10A and 10B are graphs showing carbon tetrachloride remediation as a function of pore volumes eluted through the columns 110 in the presence of vegetable oil and soil bacteria. In the drawings "G" refers to the ground level. GWL refers to ground water level.
Figure 10B:
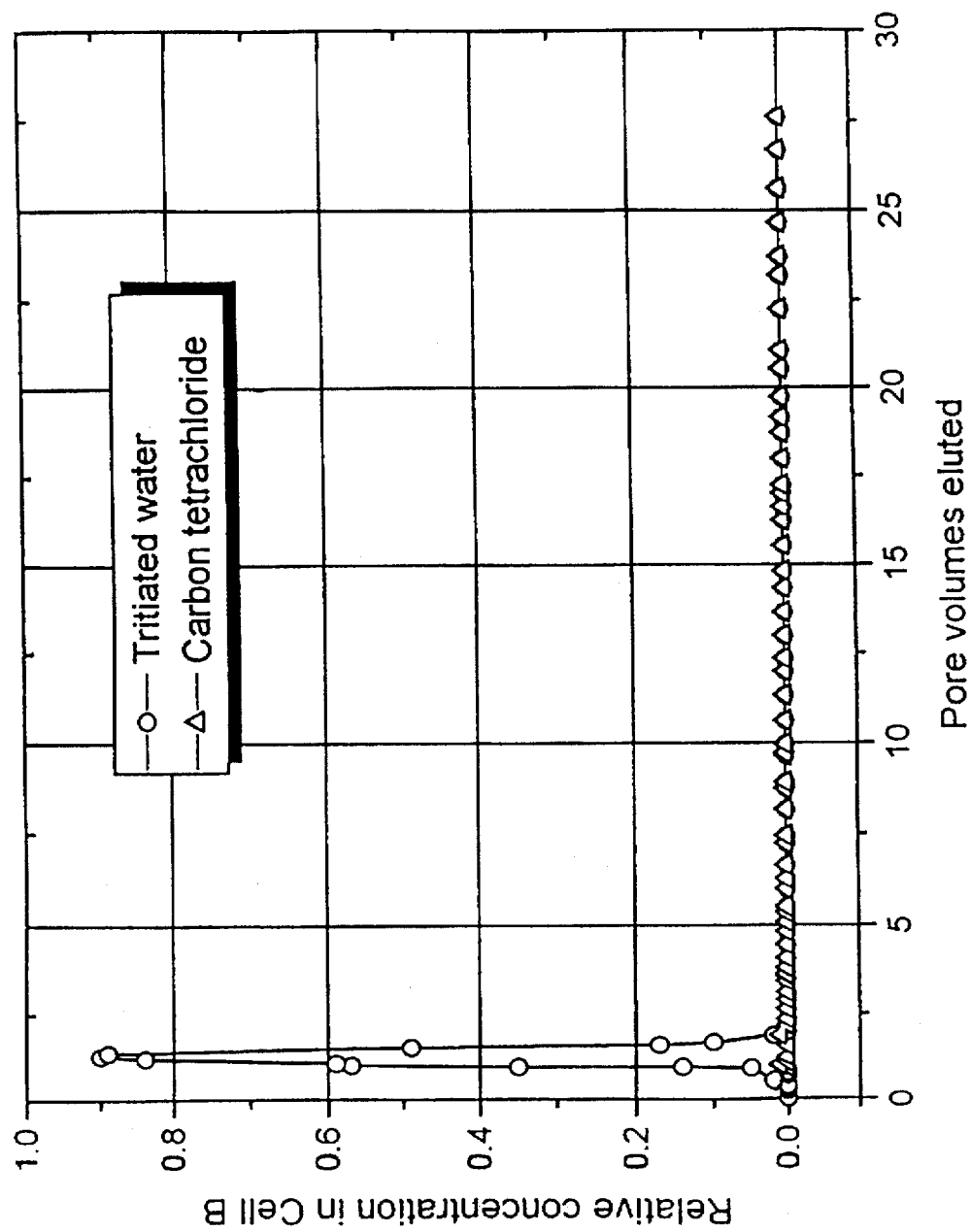

Levels of carbon tetrachloride in the outflow water were measured by gas chromatography, and tritium was measured using a scintillation counter. FIGS. 10A and 10B show the relative output concentrations (input concentration divided by output concentration) of carbon tetrachloride and tritium measured in the water versus the number of pore volumes of water eluted from columns 110 A and B. The number of pore volumes is closely related to the time scale. It can be seen that while the tritium breakthrough occurred early in the experiment, no breakthrough of carbon tetrachloride occurred from outlet 128 for the duration of the experiments. After over 100 days of nearly continuous flow of carbon tetrachloride-contaminated water into both cells A and B, no measurable levels of carbon tetrachloride were detected in the effluent, indicating that decontamination was continually taking place.

The frozen temporary zones can be lined with a porous material to create a permanent cavity, such as by using sandstone blocks. The cavity is filled with the treatment composition which can include chemical solutions.

It is intended that the foregoing description be only illustrative of the present invention and that the present invention be limited only by the hereinafter appended claims.

We claim:

1. A method for in situ removal of contaminants in a volume of flowing water in a soil or aquifer material which comprises:
   (a) installing a series of freeze pipes around the volume which is unfrozen defining a treatment zone for removal of contaminants in the soil or aquifer material;
   (b) freezing the soil or aquifer material around the volume which is unfrozen;
   (c) providing a remediation means in the volume which is unfrozen;
   (d) thawing at least some of the freeze pipes so that the flowing water containing the contaminants moves through the volume which is unfrozen allowing the treatment zone to remove the contaminants from the flowing water into the volume in the soil or aquifer.

2. The method of claim 1 wherein the step of installing comprises installing the freeze pipes perpendicular to a ground level.

3. The method of claim 2 wherein the step of installing comprises installing the pipes down to a layer in the ground which is essentially impervious to water.

4. The method of claim 2 wherein the step of installing comprises installing the pipes to a level below the contaminants.

5. The method of claim 1 wherein the step of installing comprises installing the freeze pipes at an angle to provide a V shaped cross-section in step (a) which defines the volume so that the volume can be confined by the frozen soil or aquifer material in the freezing step (b).

6. The method of any one of claims 1, 2, 3, 4 or 5 wherein the step of providing the remediation means comprises providing a microorganism which provides biodegradation in the volume.

7. The method of any one of claims 1, 2, 3, 4, or 5 wherein the step of providing the remediation means comprises providing a microorganism which provides biodegradation and providing an oil which is a carbon source for the microorganism with the microorganism in the volume.

8. The method of claim 1 wherein the step of installing comprises installing a funnel in the volume which directs the water into the volume after the thawing in step (c).

9. The method of claim 8 wherein the step of installing the funnel is injection of grout into a series of bore holes to form an impermeable barrier.

10. A method for in situ removal of contaminants from flowing groundwater in a volume of soil or aquifer material which comprises:
    (a) installing a series of freeze pipes around the volume which is unfrozen of soil or aquifer material in the path of the flowing groundwater;
    (b) freezing the soil or aquifer material around the volume which is unfrozen so as to temporarily stop flow of groundwater into the volume;
    (c) introducing a treatment composition into the soil or aquifer material within the volume which is unfrozen which facilitates removal of contaminants from the flowing groundwater; and
    (d) thawing some of the freeze pipes surrounding the volume which is unfrozen so that the groundwater containing the contaminants will flow through the treatment composition in the volume allowing contaminant removal.

11. The method of claim 10 wherein the step of installing comprises installing the freeze pipes perpendicular to a ground level.

12. The method of claim 10 wherein the step of installing comprises installing the pipes down to a layer in the ground which is essentially impervious to water.

13. The method of claim 10 wherein the step of installing comprises installing the pipes to a level below the contaminants.

14. The method of claim 10 wherein the step of installing comprises installing the freeze pipes at an angle to provide a V shaped cross-section in step (a) which defines the volume so that the volume can be confined by the frozen soil or aquifer material in the freezing step (b).

15. The method of any one of claims 10, 11, 12, 13 or 14 wherein the treatment composition is a microorganism which provides biodegradation.

16. The method of any one of claims 10, 11, 12, 13, or 14 wherein the treatment composition is a microorganism which provides biodegradation and wherein an oil which is a carbon source for the microorganism is provided with the microorganism in the volume.

17. The method of claim 10 wherein the step of installing comprises installing a funnel in the volume which directs the water into the volume after the thawing in step (c).

18. The method of claim 17 wherein the step of installing the funnel is injection of grout into a series of bore holes to form an impermeable barrier.

19. A method for the in situ removal of contaminants from flowing groundwater in soil or aquifer material which comprises:
    (a) installing a series of freeze pipes around a volume which is unfrozen of the soil or aquifer material in the path of the groundwater;
    (b) installing a well in the soil or aquifer material of the volume which is unfrozen between the series of freeze pipes;
    (c) freezing the soil or aquifer material around the volume which is unfrozen so as to temporarily stop the flow of groundwater into the volume;
    (d) removing water from the volume which is unfrozen through the well;
    (e) placing of a treatment composition through the well into the soil or aquifer material which is unfrozen; and
    (f) thawing at least some of the freeze pipes so that groundwater containing the contaminants will flow through the porous reactor material in the volume which is unfrozen.

20. The method of claim 19 wherein the step of installing comprises installing the freeze pipes perpendicular to a ground level.

21. The method of claim 19 wherein the step of installing comprises installing the pipes down to a layer in the ground which is essentially impervious to water.

22. The method of claim 19 wherein the step of installing comprises installing the pipes to a level below the contaminants.

23. The method of claim 19 wherein the step of installing comprises installing the freeze pipes at an angle to provide a V shaped cross-section in step (a) which defines the volume so that the volume can be confined by the frozen soil or aquifer material in the freezing step (b).

24. The method of any one of claims 19, 20, 21, 22 or 23 wherein the step of providing the treatment composition comprises providing a microorganism which provides biodegradation in the volume.

25. The method of any one of claims 19, 20, 21, 22, or 23 wherein the step of providing the treatment composition comprises providing a microorganism which provides biodegradation and providing an oil which is a carbon source for the microorganism with the microorganism in the volume.

26. The method of claim 19 wherein the step of installing comprises installing a funnel in the volume which directs the water into the volume after the thawing in step (c).

27. The method of claim 26 wherein the step of installing the funnel is injection of grout into a series of bore holes to create an impermeable barrier.

28. A method of in situ removal of contaminants from flowing groundwater in soil or aquifer material which comprises:

(a) installing a series of freeze pipes around a volume which is unfrozen of the soil or aquifer material in the path of the groundwater;

(b) freezing the soil or aquifer material around the volume which is unfrozen to temporarily stop the flow of groundwater into the volume;

(c) removing soil or aquifer material from the volume which is unfrozen to form a cavity in a path of the groundwater;

(d) placing of a porous reactor material in the cavity that is in the path of the groundwater in the volume which is unfrozen; and (e) thawing at least some of the freeze pipes so that groundwater containing contaminants flows through the porous reactor material in the volume which is unfrozen so as to remove the contaminants.

29. The method of claim 28 wherein the step of installing comprises installing the freeze pipes perpendicular to a ground level.

30. The method of claim 28 wherein the step of installing comprises installing the pipes down to a layer in the ground which is essentially impervious to water.

31. The method of claim 28 wherein the step of installing comprises installing the pipes to a level below the contaminants.

32. The method of claim 28 wherein the step of installing comprises installing the freeze pipes at an angle to provide a V shaped cross-section in step (a) which defines the volume so that the volume can be confined by the frozen soil or aquifer material in the freezing step (b).

33. The method of any one of claims 28, 29, 30, 31 or 32 wherein the step of facing the porous reactor material comprises providing a microorganism which provides biodegradation in the volume.

34. The method of any one of claims 28, 29, 30, 31, or 32 wherein the step of facing the porous reactor material comprises providing a microorganism which provides biodegradation and providing an oil which is a carbon source for the microorganism with the microorganism in the volume.

35. The method of claim 28 wherein the step of installing comprises installing a funnel in the volume which directs the water into the volume after the thawing in step (c).

36. The method of claim 35 wherein the step of installing the funnel is injection of grout into a series of bore holes to create an impermeable barrier.

37. A method of in situ removal of contaminants in a volume of flowing water in a soil or aquifer material which comprises:

(a) creating a water impervious barrier in the path of the volume of flowing water containing contaminants wherein the volume is unfrozen;

(b) providing a remediation means as a treatment zone in the soil or aquifer material in the volume which is unfrozen; and (c) at least partially removing the water impervious barrier, whereby the flowing water moves through the remediation means in the treatment zone which is unfrozen to remove at least some of the contaminants from the flowing water.

38. The method of claim 37 wherein the step of creating the barrier is by means of a grout.

39. The method of claim 37 wherein the step of creating the barrier is by means of injecting of a grout into a series of bore holes.

40. The method of claim 37 wherein the step of creating the barrier is by means of inserting a wall into the ground.

41. The method of any one of claims 37, 38, 39 or 40 wherein the step of providing the remediation means comprises providing a microorganism in the volume which provides biodegradation.

42. The method of any one of claims 37, 38, 39 or 40 wherein the step of providing the remediation means comprises creating a temporary freeze wall around the treatment zone.

* * * * *

UNITED STATES PATENT AND TRADEMARK OFFICE
CERTIFICATE OF CORRECTION

PATENT NO. : 5,730,550
DATED : March 24, 1998
INVENTOR(S) : Orlando B. Andersland, Craig S. Criddle, Roger B. Wallace, David C. Wiggert It is certified that error appears in the above-indentified patent and that said Letters Patent is hereby corrected as shown below:

Column 2, line 4, "Roberta" should be --Roberts--.

Column 2, line 7, "Varadarai et al" should be --Varadaraj et al--.

Column 16, line 10 (Claim 33), "wherein the step of facing" should be --wherein the step of placing--.

Column 16, line 14 (Claim 34), "wherein the step of facing" should be --wherein the step of placing--.

Signed and Sealed this

Eighteenth Day of August, 1998

Attest:

BRUCE LEHMAN

Attesting Officer

Commissioner of Patents and Trademarks